UNITED STATES PATENT OFFICE.

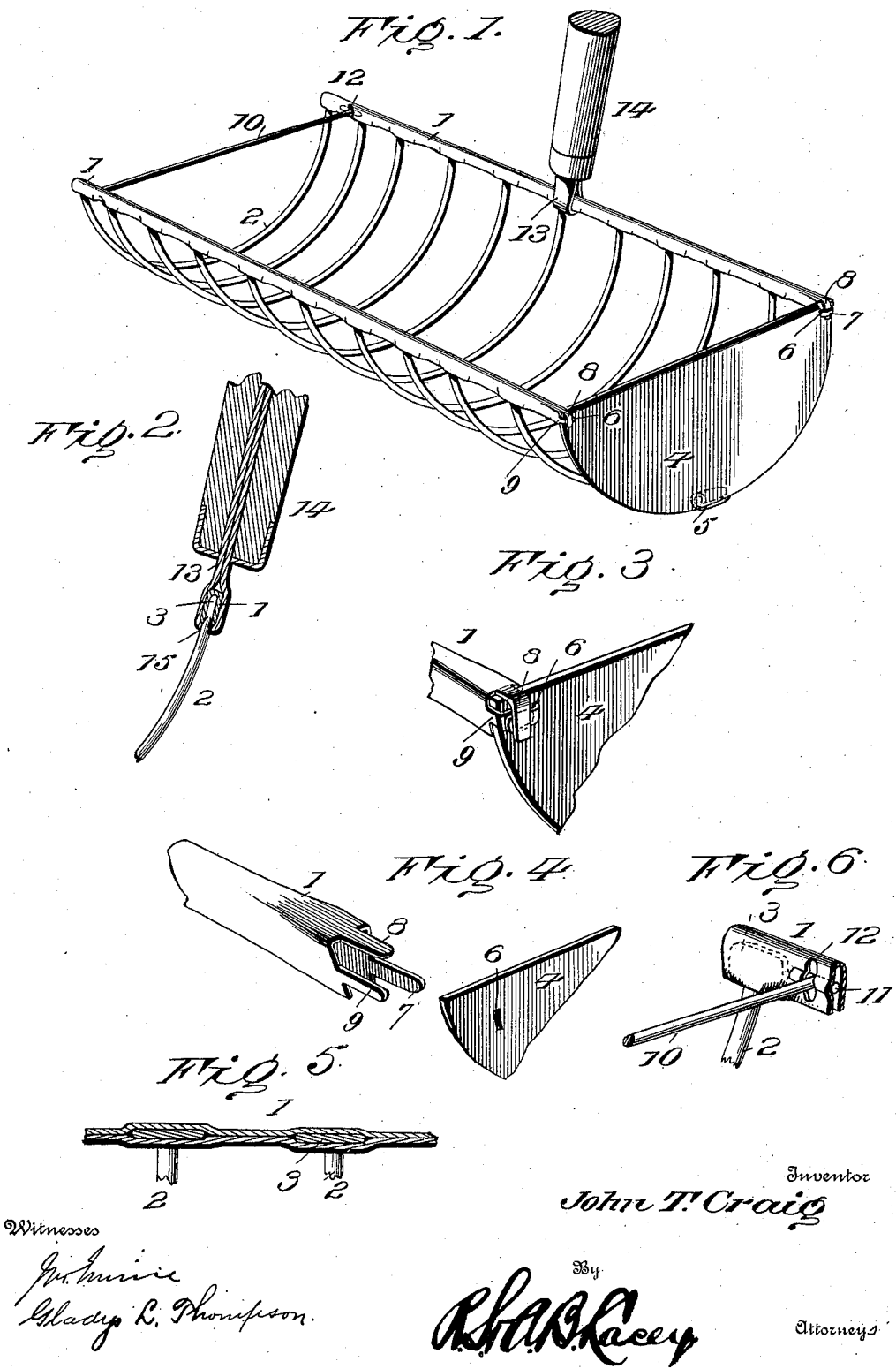

JOHN T. CRAIG, OF RAYMOND, SOUTH DAKOTA, ASSIGNOR TO F. O. CRAIG, OF PAYNE, OHIO.

POTATO-LIFTER.

SPECIFICATION forming part of Letters Patent No. 691,843, dated January 28, 1902.

Application filed August 24, 1901. Serial No. 73,153. (No model.)

*To all whom it may concern:*

Be it known that I, JOHN T. CRAIG, a citizen of the United States, residing at Raymond, in the county of Clark and State of South Dakota, have invented certain new and useful Improvements in Potato-Lifters; and I do hereby declare the following to be a full, clear, and exact description of the invention, such as will enable others skilled in the art to which it appertains to make and use the same.

This invention has relation to farm implements, and aims to provide a device for lifting potatoes or like tubers after they have been brought to the surface by a plow, fork, or other means. The lifter is constructed so as to remove all dirt from the tubers either during the act of picking them up or when carrying them to and dumping them into a receptacle.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a potato-lifter embodying the invention. Fig. 2 is a detail view showing the manner of attaching the tang to the body of the lifter. Fig. 3 is a detail view, on a larger scale, showing the joint between a bar and the end plate. Fig. 4 is a view of the parts shown in Fig. 3 separated. Fig. 5 is a detail view of the joint between a bar and a curved rod. Fig. 6 is a detail view of the joint between the tie-rod and the bars.

Corresponding and like parts are referred to in the following description and indicated in all the views of the drawings by the same reference characters.

The lifter consists of a body portion or basket and a handle, the latter being of a length to obviate stooping of the person when using the implement to pick up tubers and transfer them to a receptacle.

The basket or body portion of the lifter comprises longitudinal bars 1 and curved rods 2, disposed in parallel relation and connected at their ends in any substantial way to the bars 1. The curved rods 2 consist of lengths of stout wire, and their ends are expanded to facilitate connection with the bars 1 in the manner presently to be described. The longitudinal bars 1 are preferably formed of strips of metal folded midway of their longitudinal edges, the expanded ends of the rods 2 being inserted and clamped between the folded parts of the strips and firmly held in place thereby. By flattening the ends of the rods 2, as shown at 3, laterally-extending parts are provided for engagement with the folded portions of the bars 1, so as to prevent withdrawal or disengagement of the rods after the parts of the bars 1 have been firmly pressed together. While this manner of connecting the rods to the bars 1 is preferred, it is obvious that the connection may be formed in any desired way. The bars 1 and rods 2 form a basket of approximately trough shape, and this basket is closed at one end by a plate 4, which retains the tubers in place when the implement is lifted with the closed end lowermost for transferring the tubers to a receptacle. While the plate 4 may be held in place in any desired way, the construction shown is preferred. A tongue 5 is formed upon the rounded edge of the plate and is bent to embrace the contiguous rod 2, and slots 6 are formed in the end portions of the plate to receive tongues 7 at the end of the bars 1 adjacent to the plate 4, said tongues being clenched or bent upon the plate after being passed through the slot 6. Other tongues 8 and 9, formed at the end of the bars 1 adjacent to the plate 4, are bent so as to overlap the outer side of the plate and hold it firmly in place.

To prevent spreading of the bars 1 at the end remote from the plate 4, a tie-rod 10 is employed and is connected at its ends to the bars 1 in any selected way. T-heads 11 are formed at the ends of the tie-rod 10 and are adapted to pass through slots 12, formed in the inner folded portion of the bars 1 near their free ends, said slots extending crosswise of the bars, so as to admit of the T-heads 11 lying lengthwise of the bars 1 when in engagement therewith. The inner folded portion of the bars having the slots 12 is deflected intermediate of its edges to provide a longitudinal channel in the inner side of the folded portion to receive the T-head 11 and prevent accidental turning of the tie-rod, so as to bring the T-heads thereof in coincident relation with the slots 12. The T-heads 11 are held in the longitudinal channel by the tendency of the bars 1 to separate or spread at the ends connected by the tie-rods. The tie-rod can be readily removed when required by pressing the slotted ends of the bars 1 together a distance to admit of the T-heads 11 clearing the longitudinal channels in which they normally lie when the tie-rod is in proper position.

The tang 13, by means of which the handle 14 is connected to the basket or body of the carrier, is secured to a side of the basket midway of its ends, thereby equalizing the strain and load upon the handle when the implement is in active operation. The tang consists of a strip or bar doubled upon itself, so as to embrace the bar 1, the folded ends being brought together and let into an opening in the end of the handle 14 or secured thereto in any desired way. The folded end of the tang has an opening 15 for the passage therethrough of a rod 2, thereby preventing any possible movement of the tang upon the bar 1, to which it is fitted. The bar 1 being flattened and clamped between the folded portions of the tang 13 prevents turning of the basket with reference to the tang when the lifter is in operation.

An implement of the character set forth and constructed in the manner specified is comparatively light, durable, and effective and is free from extraneous fastenings—such as rivets, bolts, soldering, and the like—and can be manufactured at a slight cost outside of the material and placed upon the market so as to be within the reach of every one engaged in raising potatoes or tubers of any variety.

Having thus described the invention, what is claimed as new is—

1. A lifter for potatoes and tubers, the same comprising a handle and a basket, the latter comprising longitudinal bars and connecting curved rods, said basket having an end closure, substantially as set forth.

2. In a lifter for tubers, longitudinal bars formed of strips folded intermediate of their longitudinal edges and curved rods having their ends widened and clamped between the folded portions of the bars, substantially as set forth.

3. In a lifter, curved rods having their ends flattened laterally and longitudinal bars having folded portions pressed together to clamp the flattened ends of the curved rods, substantially as set forth.

4. In a lifter of the character described, and in combination with the basket comprising curved rods, and longitudinal bars, the latter having spaced portions provided with slots, a tie-rod for connecting the longitudinal bars having T-heads at its ends to be pressed through the aforesaid slots of the bars and turned to sit crosswise thereof, substantially as set forth.

5. In a lifter, and in combination with the longitudinal bars and connecting curved rods, the said bars having spaced portions formed with slots and having the parts intermediate of the ends of the slots deflected to form channels, a tie-rod having T-heads to be passed through the aforesaid slots of the longitudinal bars and turned to lie in the said channels to prevent casual displacement of the tie-rod, substantially as set forth.

6. In a lifter of the character described, and in combination with the basket comprising longitudinal bars and connecting curved rods, a tang consisting of a folded strip embracing the sides of a longitudinal bar and having an opening in its forward end for the passage therethrough of one of the said curved rods, substantially as set forth.

7. In a lifter of the character described, longitudinal bars composed of folded portions and having a series of tongues at one end, curved rods having their end portions clamped between the folded parts of the said bars, and a plate closing one end of the lifter and having slots to receive a tongue of the bars which is clenched upon the plate, the remaining tongues being bent upon the plate to hold it in place, substantially as set forth.

8. In a lifter of the character described, and in combination with the longitudinal bars having tongues at one end, and connecting curved rods, an end plate having a tongue bent around the adjacent curved rod and having slots in its end portions to receive a tongue of the longitudinal bars which is bent to secure the plate, the remaining tongues being likewise bent, substantially as set forth.

In testimony whereof I affix my signature in presence of two witnesses.

JOHN T. CRAIG. [L. S.]

Witnesses:
T. MACALPINE,
FRANK G. BOHRI.